US010499097B2

(12) United States Patent
Zamaraiev et al.

(10) Patent No.: US 10,499,097 B2
(45) Date of Patent: *Dec. 3, 2019

(54) METHODS, SYSTEMS, AND MEDIA FOR DETECTING ABUSIVE STEREOSCOPIC VIDEOS BY GENERATING FINGERPRINTS FOR MULTIPLE PORTIONS OF A VIDEO FRAME

(71) Applicant: Google LLC, Mountain View, CA (US)

(72) Inventors: Valerii Zamaraiev, Zurich (CH); Filip Pavetic, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,583

(22) Filed: Dec. 11, 2017

(65) Prior Publication Data
US 2018/0176619 A1 Jun. 21, 2018

Related U.S. Application Data

(63) Continuation of application No. 15/382,113, filed on Dec. 16, 2016, now Pat. No. 9,872,056.

(51) Int. Cl.
H04N 21/24 (2011.01)
H04N 21/25 (2011.01)
(Continued)

(52) U.S. Cl.
CPC ....... *H04N 21/2541* (2013.01); *G06F 16/783* (2019.01); *G06F 21/10* (2013.01);
(Continued)

(58) Field of Classification Search
CPC ........... H04N 21/2408; H04N 21/2585; H04N 21/2743; H04N 21/278; H04N 21/64715; H04N 21/658
(Continued)

(56) References Cited

U.S. PATENT DOCUMENTS

| 8,340,449 | B1 | 12/2012 | Yagnik et al. |
| 2008/0059991 | A1 | 3/2008 | Romano |

(Continued)

FOREIGN PATENT DOCUMENTS

| EP | 2437498 | 4/2012 |
| JP | 2012523627 | 10/2012 |
| JP | 2014194808 | 10/2014 |

OTHER PUBLICATIONS

Notice of Allowance dated Sep. 19, 2017 in U.S. Appl. No. 15/382,113.
(Continued)

*Primary Examiner* — Dominic D Saltarelli
(74) *Attorney, Agent, or Firm* — Byrne Poh LLP

(57) ABSTRACT

Methods, systems, and media for identifying content in stereoscopic videos and, more particularly, for detecting abusive stereoscopic videos by generating fingerprints for multiple portions of a video frame are provided. The method comprises: receiving, from a user device, a video content item for uploading to a content provider; selecting a frame from a plurality of frames of the video content item for generating one or more fingerprints corresponding to the video content item; generating a first fingerprint corresponding to the selected frame, a second fingerprint corresponding to a first encoded portion of the selected frame, and a third fingerprint corresponding to a second encoded portion of the selected frame; comparing each of the first fingerprint, the second fingerprint, and the third fingerprint to a plurality of reference fingerprints corresponding to reference video content items; determining whether at least one of the first fingerprint, the second fingerprint, and the third fingerprint match a reference fingerprint of the plurality of reference fingerprints; and, in response to determining that at least one of the first fingerprint, the second fingerprint, and the third
(Continued)

fingerprint match the reference fingerprint, causing an indication of the match to be presented on the user device.

21 Claims, 5 Drawing Sheets

(51) Int. Cl.

| | | |
|---|---|---|
| *H04N 21/27* | (2011.01) | |
| *H04N 21/64* | (2011.01) | |
| *H04N 21/65* | (2011.01) | |
| *H04N 21/254* | (2011.01) | |
| *H04N 19/46* | (2014.01) | |
| *H04N 21/222* | (2011.01) | |
| *H04N 21/4627* | (2011.01) | |
| *H04N 13/161* | (2018.01) | |
| *G06F 21/10* | (2013.01) | |
| *G06K 9/00* | (2006.01) | |
| *H04N 21/835* | (2011.01) | |
| *H04N 13/194* | (2018.01) | |
| *H04N 21/231* | (2011.01) | |
| *H04N 21/234* | (2011.01) | |
| *H04N 21/2743* | (2011.01) | |
| *H04N 21/81* | (2011.01) | |
| *G06F 16/783* | (2019.01) | |

(52) U.S. Cl.
CPC ....... *G06K 9/00744* (2013.01); *H04N 13/161* (2018.05); *H04N 13/194* (2018.05); *H04N 19/46* (2014.11); *H04N 21/2223* (2013.01); *H04N 21/23109* (2013.01); *H04N 21/23418* (2013.01); *H04N 21/2743* (2013.01); *H04N 21/4627* (2013.01); *H04N 21/816* (2013.01); *H04N 21/835* (2013.01)

(58) Field of Classification Search
USPC .................................................. 725/25, 120
See application file for complete search history.

(56) References Cited

U.S. PATENT DOCUMENTS

| | | |
|---|---|---|
| 2009/0028517 A1 | 1/2009 | Shen et al. |
| 2009/0165031 A1 | 6/2009 | Li et al. |
| 2010/0262488 A1 | 10/2010 | Harrison et al. |
| 2015/0113040 A1 | 4/2015 | Harron et al. |
| 2016/0119690 A1* | 4/2016 | Yabu .................... H04N 21/812 |
| | | 725/19 |
| 2015/0093017 A1 | 11/2018 | Hefeeda et al. |

OTHER PUBLICATIONS

Bitaghsir et al., "Stereo Image Watermarking Method Baed on Binocular Just Noticeable Differences", in the Proceedings of the IEEE 11th International ISC Conference on Information Security and Cryptology, Sep. 3, 2014, pp. 33-38.
International Search Report and Written Opinion dated Jan. 4, 2018 in International Patent Application No. PCT/US2017/054075.
Wu et al., "Differntial Watermarking Scheme of Stereo Video", in the Proceedings of the Proceeedings of the IEEE 14th International Conference on Communication Technology, Nov. 9, 2012, pp. 744-748.
Zhang et al., "Binocular Suppression Based Visual Masking Model for Stereo Image Watermarking", in the Proceedings of the IEEE 16th International Conference on Communication Technology, Oct. 18, 2015, pp. 32-36.
Notice of Allowance dated Aug. 16, 2019 in KR Patent Application No. 10-2019-7020201.
Notice of Allowance dated Oct. 21, 2019 in JP Patent Application No. 2019-529572.

\* cited by examiner

METHODS, SYSTEMS, AND MEDIA FOR DETECTING ABUSIVE STEREOSCOPIC VIDEOS BY GENERATING FINGERPRINTS FOR MULTIPLE PORTIONS OF A VIDEO FRAME

CROSS-REFERENCE TO RELATED APPLICATIONS

This application is a continuation of U.S. patent application Ser. No. 15/382,113, filed Dec. 16, 2016, which is hereby incorporated by reference herein in its entirety.

TECHNICAL FIELD

The disclosed subject matter relates to methods, systems, and media for identifying content in stereoscopic videos. More particularly, the disclosed subject matter relates to detecting abusive stereoscopic videos by generating fingerprints for multiple portions of a video frame.

BACKGROUND

Video content providers can receive uploaded video content, store the uploaded video content, and then provide the uploaded video content to many users, for example, by streaming the video content to multiple user devices. These video content providers may determine whether the uploaded video content matches video content in a reference database, for example, of copyrighted content. With the advent of immersive or 360-degree spherical video content, these video content providers have started to receive uploaded video content containing three-dimensional video content. However, it can be difficult to determine whether such three-dimensional video content matches video content in a reference database.

Accordingly, it is desirable to provide methods, systems, and media for identifying content in stereoscopic videos and, more particularly, for detecting abusive stereoscopic videos by generating fingerprints for multiple portions of a video frame.

SUMMARY

Methods, systems, and media for identifying content in stereoscopic videos and, more particularly, for detecting abusive stereoscopic videos by generating fingerprints for multiple portions of a video frame are provided.

In accordance with some embodiments of the disclosed subject matter, a computer-implemented method for identifying content in stereoscopic videos is provided, the method comprising: receiving, from a user device, a video content item for uploading to a content provider; selecting a frame from a plurality of frames of the video content item for generating one or more fingerprints corresponding to the video content item; generating a first fingerprint corresponding to the selected frame, a second fingerprint corresponding to a first encoded portion of the selected frame, and a third fingerprint corresponding to a second encoded portion of the selected frame; comparing each of the first fingerprint, the second fingerprint, and the third fingerprint to a plurality of reference fingerprints corresponding to reference video content items; determining whether at least one of the first fingerprint, the second fingerprint, and the third fingerprint match a reference fingerprint of the plurality of reference fingerprints; and, in response to determining that at least one of the first fingerprint, the second fingerprint, and the third fingerprint match the reference fingerprint, causing an indication of the match to be presented on the user device.

In some embodiments, the method further comprises causing storage of the video content item to be blocked in response to determining that at least one of the first fingerprint, the second fingerprint, and the third fingerprint match the reference fingerprint.

In some embodiments, the first encoded portion of the selected frame and the second encoded portion of the selected frame correspond to a first image to be presented to a left eye of a viewer and a second image to be presented to a right eye of the viewer when the video content item is presented stereoscopically.

In some embodiments, the first encoded portion of the selected frame is a left half of the selected frame and the second encoded portion of the selected frame is a right half of the selected frame.

In some embodiments, the first encoded portion of the selected frame is a top half of the selected frame and the second encoded portion of the selected frame is a bottom half of the selected frame.

In some embodiments, the method further comprises receiving, from the user device, an indication that the video content item contains three-dimensional video content, wherein the first fingerprint and the second fingerprint are generated in response to receiving the indication that the video content item contains three-dimensional video content.

In accordance with some embodiments of the disclosed subject matter, a system for identifying content in stereoscopic videos is provided, the system comprising a hardware processor that is configured to: receive, from a user device, a video content item for uploading to a content provider; select a frame from a plurality of frames of the video content item for generating one or more fingerprints corresponding to the video content item; generate a first fingerprint corresponding to the selected frame, a second fingerprint corresponding to a first encoded portion of the selected frame, and a third fingerprint corresponding to a second encoded portion of the selected frame; compare each of the first fingerprint, the second fingerprint, and the third fingerprint to a plurality of reference fingerprints corresponding to reference video content items; determine whether at least one of the first fingerprint, the second fingerprint, and the third fingerprint match a reference fingerprint of the plurality of reference fingerprints; and, in response to determining that at least one of the first fingerprint, the second fingerprint, and the third fingerprint match the reference fingerprint, cause an indication of the match to be presented on the user device.

In accordance with some embodiments of the disclosed subject matter, a non-transitory computer-readable medium containing computer-executable instructions that, when executed by a processor, cause the processor to perform a method for identifying content in stereoscopic videos is provided, the method comprising: receiving, from a user device, a video content item for uploading to a content provider; selecting a frame from a plurality of frames of the video content item for generating one or more fingerprints corresponding to the video content item; generating a first fingerprint corresponding to the selected frame, a second fingerprint corresponding to a first encoded portion of the selected frame, and a third fingerprint corresponding to a second encoded portion of the selected frame; comparing each of the first fingerprint, the second fingerprint, and the third fingerprint to a plurality of reference fingerprints corresponding to reference video content items; determining whether at least one of the first fingerprint, the second fingerprint, and the third fingerprint match a reference fingerprint of the plurality of reference fingerprints; and, in response to determining that at least one of the first fingerprint, the second fingerprint, and the third fingerprint match the reference fingerprint, causing an indication of the match to be presented on the user device.

In accordance with some embodiments of the disclosed subject matter, a system for identifying content in stereoscopic videos is provided, the system comprising: means for receiving, from a user device, a video content item for uploading to a content provider; means for selecting a frame from a plurality of frames of the video content item for generating one or more fingerprints corresponding to the video content item; means for generating a first fingerprint corresponding to the selected frame, a second fingerprint corresponding to a first encoded portion of the selected frame, and a third fingerprint corresponding to a second encoded portion of the selected frame; means for comparing each of the first fingerprint, the second fingerprint, and the third fingerprint to a plurality of reference fingerprints corresponding to reference video content items; means for determining whether at least one of the first fingerprint, the second fingerprint, and the third fingerprint match a reference fingerprint of the plurality of reference fingerprints; and, in response to determining that at least one of the first fingerprint, the second fingerprint, and the third fingerprint match the reference fingerprint, means for causing an indication of the match to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
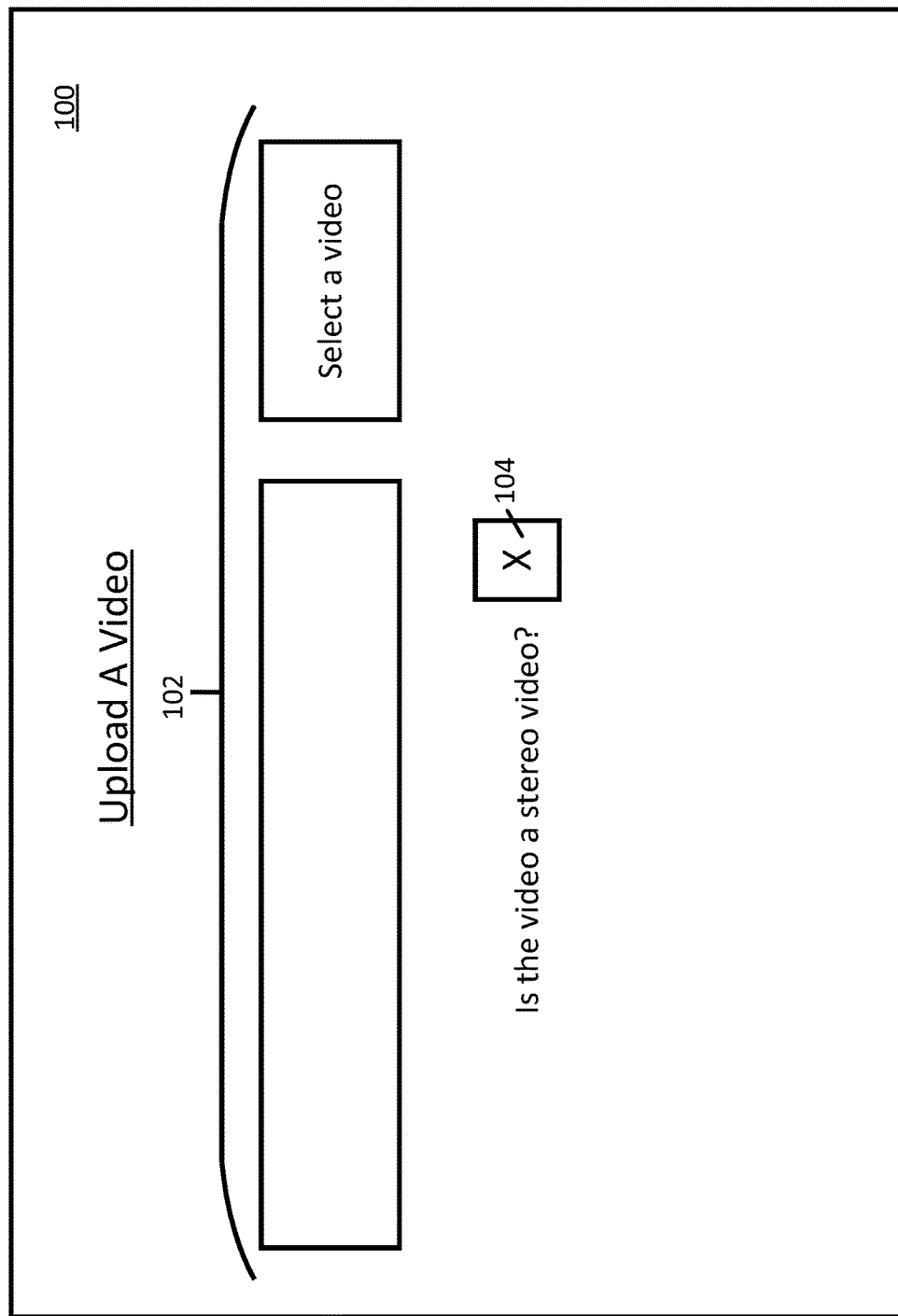
FIG. 1 shows an illustrative example of a user interface for receiving a video content upload from a content creator in accordance with some embodiments of the disclosed subject matter.

In accordance with various embodiments, mechanisms (which can include methods, systems, and media) for identifying content in stereoscopic videos and, more particularly, for detecting abusive stereoscopic videos by generating fingerprints for multiple portions of a video frame are provided.

In some embodiments, the mechanisms described herein can be used to detect particular types of video content in an uploaded video content item. For example, in some embodiments, the mechanisms can be used to detect potentially copyrighted video content or potentially copyrighted audio content within the uploaded video content item. It should be noted that various fingerprinting techniques have been used to identify copyrighted content, for example, by matching a portion of a content item to a reference content item in a database of reference content items. However, these fingerprinting techniques are sometimes unable to identify copyrighted video content when an uploaded video content item is three-dimensional video content. For example, in instances where the uploaded video content item includes three-dimensional content that is encoded as stereoscopic video content (e.g., with video content to be delivered to a left and right eye of a user encoded as a left and right half of a frame, and/or encoded in any other suitable manner), the fingerprinting techniques may be unable to detect a match to video content in the reference database. In particular, in instances where the fingerprinting techniques are not aware that the uploaded video content item includes stereoscopic video content (e.g., based on a user who uploads the video content item not indicating that the uploaded content includes stereoscopic video content, and/or based on any other suitable information), the fingerprinting techniques may fingerprint an entire frame of the video content item, and may therefore not detect a match to reference video content items. Conversely, in instances where the uploaded video content item includes two-dimensional video content but is tagged or otherwise indicated as being three-dimensional video content (e.g., by a user uploading the video content item, and/or in any other suitable manner), the fingerprinting techniques may try to match half of a frame of the video content item with reference video content items, and may therefore not detect matching video content in the reference database.

In some embodiments, the mechanisms described herein can generate fingerprints for a whole frame of the uploaded video content item, a first encoded portion of the frame for the uploaded video content item, and a second encoded portion of the frame for the uploaded video content item. For example, in some embodiments, the first encoded portion of the frame can correspond to a first half of the frame that is to be delivered to a left eye of a viewer if the video is delivered as a stereoscopically encoded three-dimensional video content item, and the second encoded portion of the frame can correspond to a second half of the frame that is to be delivered to a right eye of the viewer if the video is delivered as a stereoscopically encoded three-dimensional video content item. As a more particular example, in some embodiments, the first half of the frame and the second half of the frame can correspond to a left half of the frame and a right half of the frame, respectively. Additionally or alternatively, in some embodiments, the first half of the frame and the second half of the frame can be any suitable arrangement of stereoscopic video content, such as a top half and a bottom half of a frame, alternating pixels of a frame (e.g., in a checkerboard pattern), alternating frames of the video content item, and/or any other suitable arrangement.

In some embodiments, the mechanisms can then compare the fingerprints generated from the whole frame and the fingerprints generated from each encoded portion of the frame with fingerprints of video content items stored in a reference database, and can detect whether any of the generated fingerprints match the reference fingerprints. It should be noted that, in some embodiments, the mechanisms can therefore detect whether the uploaded video content item matches reference video content irrespective of whether the uploaded video content item includes two-dimensional video content or three-dimensional video content. It should also be noted that, in some embodiments, the mechanisms can therefore detect whether the uploaded video content item matches reference video content irrespective of whether the uploaded video content item that was uploaded by a user has correctly indicated or designated the video content item as being a two-dimensional video content item or a three-dimensional video content item.

In some embodiments, if the mechanisms described herein detect a match between the uploaded video content item and a reference video content item (e.g., indicating that the uploaded video content item is potentially copyrighted video content), the mechanisms can cause an indication of the match to be presented on a user device that transmitted and/or uploaded the video content item. For example, in some embodiments, a message can be presented on the user device indicating that the uploaded content matches reference video content. Additionally or alternatively, in some embodiments, the mechanisms can block storage of the uploaded video content item in response to detecting a match to a reference video content item. Furthermore, in some embodiments, the mechanisms can cause an uploaded video content item that has matched reference video content to be flagged for manual review.

Note that, in some embodiments, the uploaded video content item can be any suitable type of video content, including videos, movies, television programs, live-streamed content, and/or any other suitable video content. For example, in an instance where the uploaded video content item is live-streamed video content, a user device can transmit live video content to a server, which can host the received video content and cause the video content to be streamed to other user devices, for example, in response to a request to view the video content. In instances where the uploaded video content item is live-streamed video content, the mechanisms described herein can generate fingerprints for portions of the live-steamed content as it is received. For example, in some embodiments, where the live-steamed video content item is being transmitted from a user device to a server that is hosting the video content, the mechanisms can generate fingerprints for portions of the received video content of any suitable duration (e.g., one second, two seconds, five seconds, one minute, and/or any other suitable duration) as they are received by the server. In instances where a match of live-streamed content to reference video content in a reference database, the mechanisms described herein can present an indication that a match of the live-streamed content to reference video content in the reference database on the user device transmitting the live-streamed content to the server. For example, in some embodiments, the mechanisms can cause a message to be presented on the user device indicating that the live-streamed content has been determined to match a particular video content item in the reference database and can, in some embodiments, identify a name of the particular video content item in the reference database. Additionally or alternatively, in some embodiments, the mechanisms can block further streaming of the live-streamed video content in response to detecting a match to reference video content.

Turning to FIG. 1, an example 100 of a user interface for receiving an uploaded video content item and information about the video content item to be uploaded to a content provider is shown in accordance with some embodiments of the disclosed subject matter. As illustrated, user interface 100 can include a content item selection interface 102 and a content item information interface 104.

In some embodiments, content item selection interface 102 can include any suitable user interface controls for allowing a user of user interface 100 to select a content item for upload. For example, as shown in FIG. 1, in some embodiments, content item selection interface 102 can include a push button that, when selected, can cause a directory listing of a user device associated with user interface 100 to be presented. In some embodiments, a selected content item can then be indicated in a text box. In some embodiments, content item selection interface 102 can be omitted.

In some embodiments, content item information interface 104 can be used to allow a content creator uploading a particular video content item to indicate any suitable information about the video content item. For example, as shown in FIG. 1, in some embodiments, content item information interface 104 can include user interface controls to allow the content creator to indicate whether or not the uploaded video content item is a stereoscopic video content item. In some embodiments, any other suitable information can be indicated via content item information interface 104. For example, in some embodiments, the information can include a name of the video content item, a name of a creator of the video content item, credit information or collaboration information associated with the video content item, keywords associated with the video content item, access control or privacy settings associated with the video content item, and/or any other suitable information.

Figure 3:
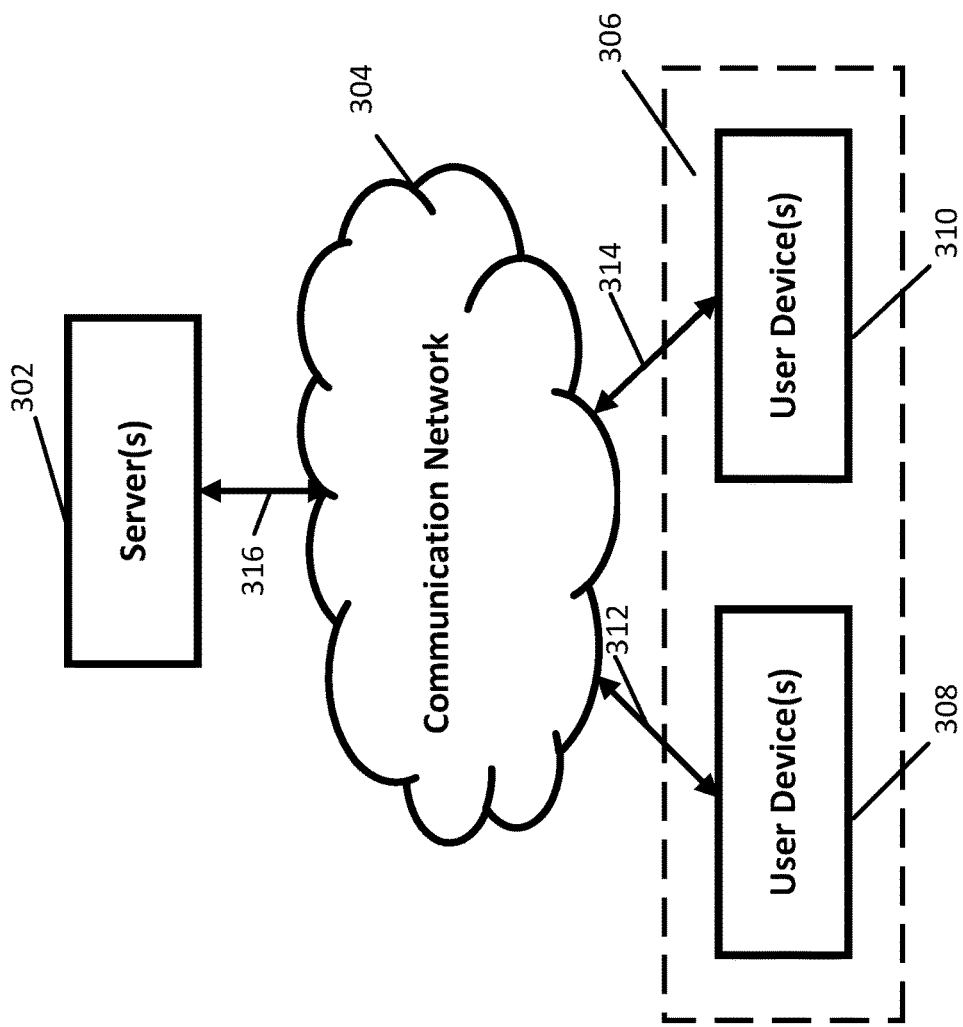
FIG. 3 shows a schematic diagram of an illustrative system suitable for implementation of mechanisms described herein for detecting abusive stereoscopic videos by generating fingerprints for multiple portions of a video frame in accordance with some embodiments of the disclosed subject matter.

Turning to FIG. 3, an example of an illustrative system 300 suitable for implementation of mechanisms described herein for identifying content in stereoscopic videos and, more particularly, for detecting abusive stereoscopic videos by generating fingerprints for multiple portions of a video frame is shown in accordance with some embodiments of the disclosed subject matter is shown. As illustrated, hardware 300 can include one or more servers, such as a server 302, a communication network 304, and/or one or more user devices 306, such as user devices 308 and 310.

In some embodiments, server(s) 302 can be any suitable server(s) for receiving an upload of a video content item, determining whether the uploaded video content item matches a reference video content item, and/or performing any other suitable functions. For example, as described below in connection with FIG. 5, server(s) 302 can perform any suitable fingerprinting technique(s) to determine whether an uploaded video content item matches a video content item in a reference database. As a more particular example, in some embodiments, server(s) 302 can generate fingerprints of an entire frame of the video content item as well as a first half and a second half of the frame to determine whether the video content item matches a reference video content item, regardless of whether the uploaded video content item is a stereoscopic video content item. In some embodiments, server(s) 302 can be omitted.

Communication network 304 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links 312 and/or 314 to communication network 304 that can be linked via one or more communications links (e.g., communications link 316) to server(s) 302. Communications links 312, 314, and/or 316 can be any communications links suitable for communicating data among user devices 306 and server(s) 302 such as network links, dial-up links, wireless links, hard-wired links, any other suitable communications links, or any suitable combination of such links.

In some embodiments, user devices 306 can include one or more computing devices suitable for transmitting a video content item to server(s) 302, transmitting information related to the video content item to server(s) 302, and/or any other suitable functions. For example, in some embodiments, user devices 306 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 302 is illustrated as a single device, the functions performed by server 302 can be performed using any suitable number of devices in some embodiments. For example, in some embodiments, multiple devices can be used to implement the functions performed by server 302.

Although two user devices 308 and 310 are shown in FIG. 3, any suitable number of user devices, and/or any suitable types of user devices, can be used in some embodiments.

Figure 4:
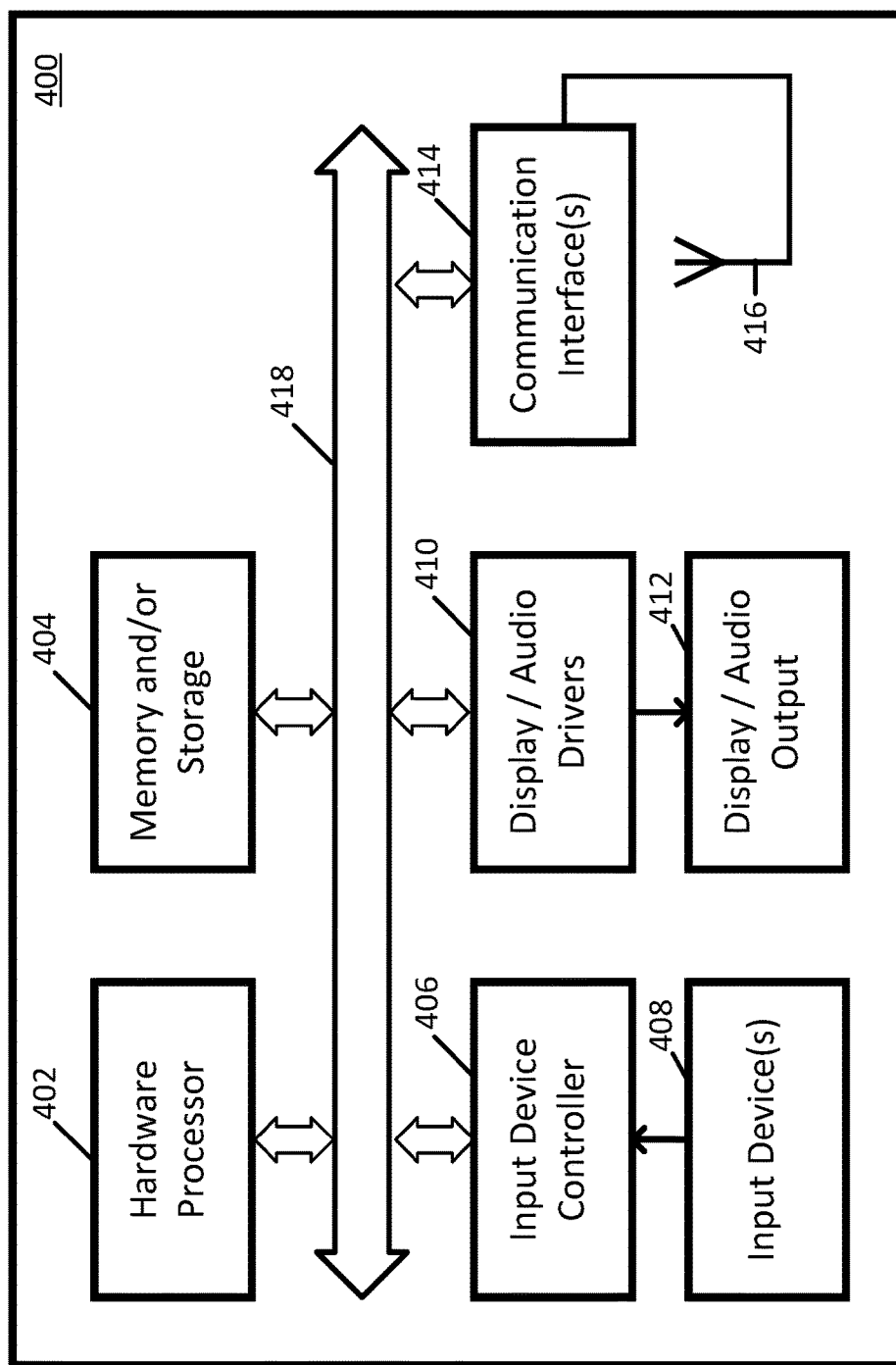
FIG. 4 shows a detailed example of hardware that can be used in a server and/or a user device of FIG. 3 in accordance with some embodiments of the disclosed subject matter.

Server(s) 302 and user devices 306 can be implemented using any suitable hardware in some embodiments. For example, in some embodiments, devices 302 and 306 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, message interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as server 302). For example, the server program can cause hardware processor 402 fingerprint one or more frames of an uploaded video content item, determine whether the fingerprint(s) match a video content item in a reference database, block an uploaded video content item in response to determining the video content item matches a video content item in a reference database, and/or perform any other suitable actions. In some embodiments, hardware processor 402 can be controlled by a computer program stored in memory and/or storage 404 of user device 306. For example, the computer program can cause hardware processor 402 to transmit a video content item to server(s) 302, and/or perform any other suitable actions.

Memory and/or storage 404 can be any suitable memory and/or storage for storing programs, data, media content, advertisements, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In another example, input device controller 406 can be circuitry for receiving input from a head-mountable device (e.g., for presenting virtual reality content or augmented reality content).

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

Figure 5:
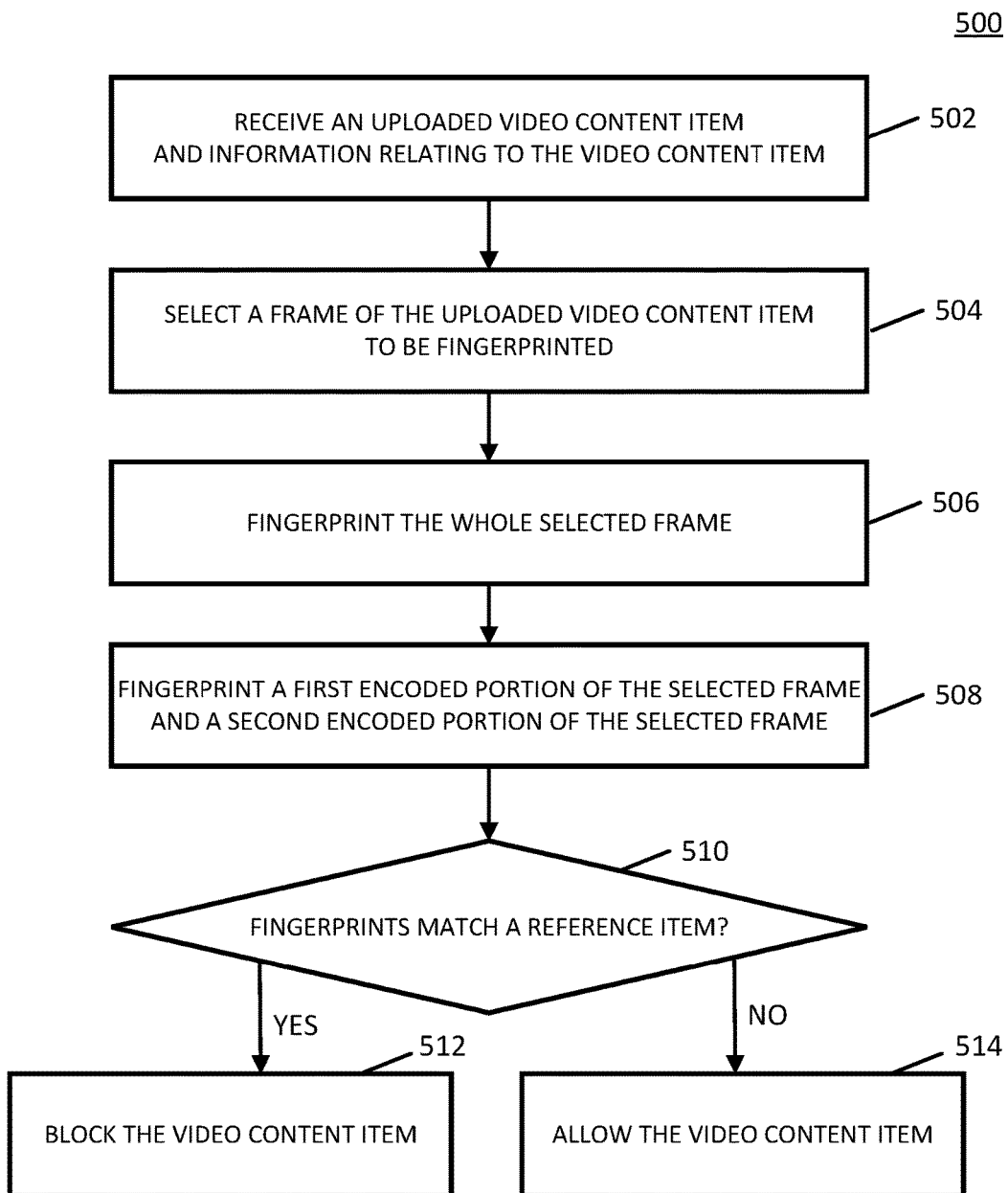
FIG. 5 shows an illustrative example of a process for detecting abusive stereoscopic videos by generating fingerprints for multiple portions of a video frame in accordance with some embodiments of the disclosed subject matter.

Turning to FIG. 5, an example 500 of a process for identifying content in stereoscopic videos and, more particularly, for detecting abusive stereoscopic videos by generating fingerprints for multiple portions of a video frame is shown in accordance with some embodiments of the disclosed subject matter. In some embodiments, blocks of process 500 can be executed on server(s) 302.

Process 500 can begin by receiving an uploaded video content item at 502. In some embodiments, the video content item can be uploaded by any suitable entity. For example, in some embodiments, the video content item can be uploaded by a creator of the video content item, and/or any other suitable entity. In another example, in some embodiments, multiple video content items can be uploaded by an entity to a content provider (e.g., using an application program interface). In some embodiments, the video content item can be any suitable type of video content, such as a television program, a movie, live-streamed content (e.g., where the uploaded video content item is a video identifier of the live-streamed content), a video advertisement, and/or any other suitable type of video content. Additionally, in some embodiments, the video content item can include three-dimensional video content, which can be encoded in any suitable manner. For example, in some embodiments, the three-dimensional video content can be encoded as stereoscopic video content, with left and right images encoded in any suitable format. As a more particular example, in some embodiments, left and right images can be encoded side by side within each frame of the video content item, in a top half and a bottom half of each frame of the video content item, through interleaved pixels within each frame of the video content item (e.g., in a checkerboard pattern), as sequential frames of the video content item, and/or in any other suitable format.

In some embodiments, process 500 can additionally receive any suitable information about the uploaded video content item. For example, as shown in and described above in connection with FIG. 1, process 500 can receive information from a user uploading the video content item that indicates whether the video content item includes three-dimensional content that is stereoscopically encoded. In some embodiments, process 500 can additionally or alternatively receive any other suitable information, such as a name of the video content item, a name of a creator of the video content item, credit information or collaboration information associated with the video content item, keywords associated with the video content item, access control or privacy settings associated with the video content item, and/or any other suitable information.

Note that, in some embodiments, process 500 can determine whether the uploaded video content item includes three-dimensional video content that is stereoscopically encoded using any suitable technique or combination of techniques. For example, in some embodiments, process 500 can determine whether image content in a pixel in a left half of a frame corresponds to image content in a corresponding pixel in a right half of the frame to determine whether the frame includes image content to be delivered to left and right eyes of a viewer. As another example, in some embodiments, process 500 can determine whether image content in a pixel in a top half of a frame corresponds to image content in a corresponding pixel in a bottom half of the frame to determine whether the frame includes image content to be delivered to left and right eyes of a viewer. Additionally or alternatively, in instances where process 500 receives an explicit indication from a user (e.g., via user interface 100, and/or in any other suitable manner) of whether the uploaded video content item includes three-dimensional video content, process 500 can verify the explicit user input using any suitable technique or combination of techniques.

At 504, in some embodiments, process 500 can select a frame of the uploaded video content item to be fingerprinted. In some embodiments, the frame can be selected in any suitable manner. For example, in some embodiments, process 500 can select a frame that is determined to be a key frame in the video content item. As a more particular example, in some embodiments, the selected key frame can be one that is identified based on a motion analysis of the video content item and includes a time point with content in motion. As another more particular example, in some embodiments, the selected key frame can be one that is a boundary between two different scenes in the video content item. As another example, in some embodiments, process 500 can randomly select a frame of the uploaded video content item. As yet another example, in some embodiments, process 500 can generate fingerprints corresponding to a series of frames (e.g., every frame, every other frame, every tenth frame, and/or any other series) of the uploaded video content item until either a match to a video content item in a reference database is found or all of the frames of the uploaded video content item have been analyzed.

In some embodiments, process 500 can employ a plurality of approaches for selecting a frame from the uploaded video content item. For example, process 500 can determine which of the plurality of approaches (e.g., motion analysis, boundary analysis, random selection, etc.) has resulted in a generated fingerprint that matches a fingerprint of a reference video content item with the fewest number of selected frames and, in response, assign process 500 to use that approach for selecting the frame from the uploaded video content item. In another example, process 500 can select multiple approaches for selecting a frame from the uploaded video content item, where one or more fingerprints are generated for a frame selected based on a motion analysis and one or more fingerprints are generated for a frame selected based on boundary analysis.

Figure 2A:
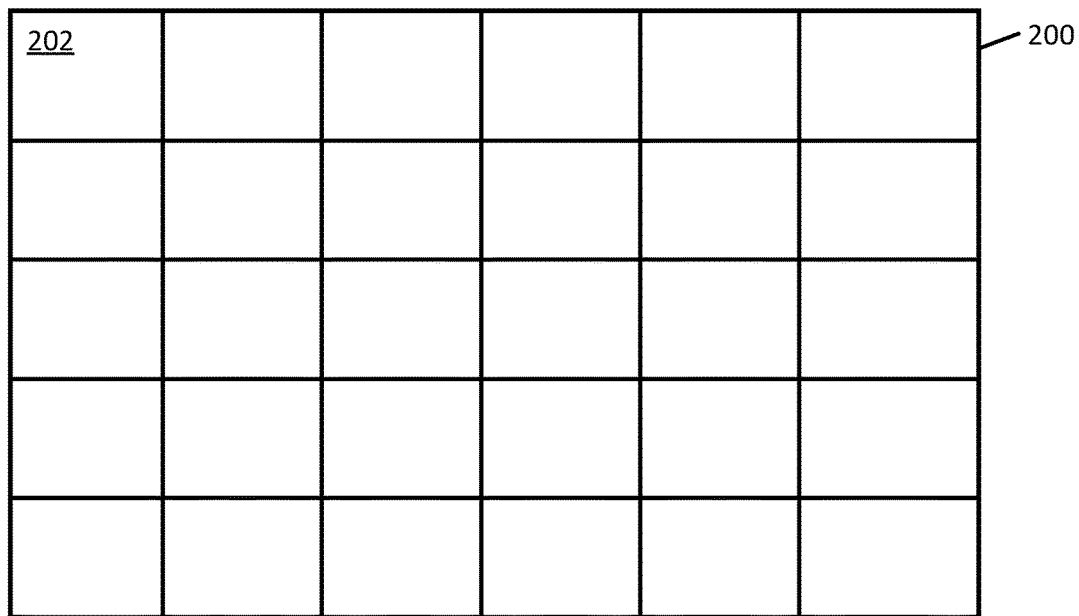
FIGS. 2A and 2B show illustrative examples of schematic diagrams for generating fingerprints associated with a whole frame and two encoded portions of a frame of a video content item in accordance with some embodiments of the disclosed subject matter.

In some embodiments, process 500 can generate one or more fingerprints of the entire selected frame at 506. Turning to FIG. 2A, an example of a frame 200 is shown in accordance with some embodiments of the disclosed subject matter. As illustrated, frame 200 can include any suitable number of pixels (such as pixel 202) that can be arranged in any suitable manner. In some embodiments, process 500 can generate one or more fingerprints of frame 200 by creating one or more signatures that represent the image content of frame 200. For example, in some embodiments, the one or more signatures can include a histogram of color, saturation, or hue information of frame 200. In some embodiments, the one or more signatures can be based on any other suitable information relating to frame 200. In some embodiments, process 500 can divide frame 200 into two or more spatial blocks and can calculate one or more signatures for each of the spatial blocks. In some embodiments, a first fingerprint generated by process 500 corresponding to the entire selected frame can be based on any of the generated signatures or any combination of the signatures.

Figure 2B:
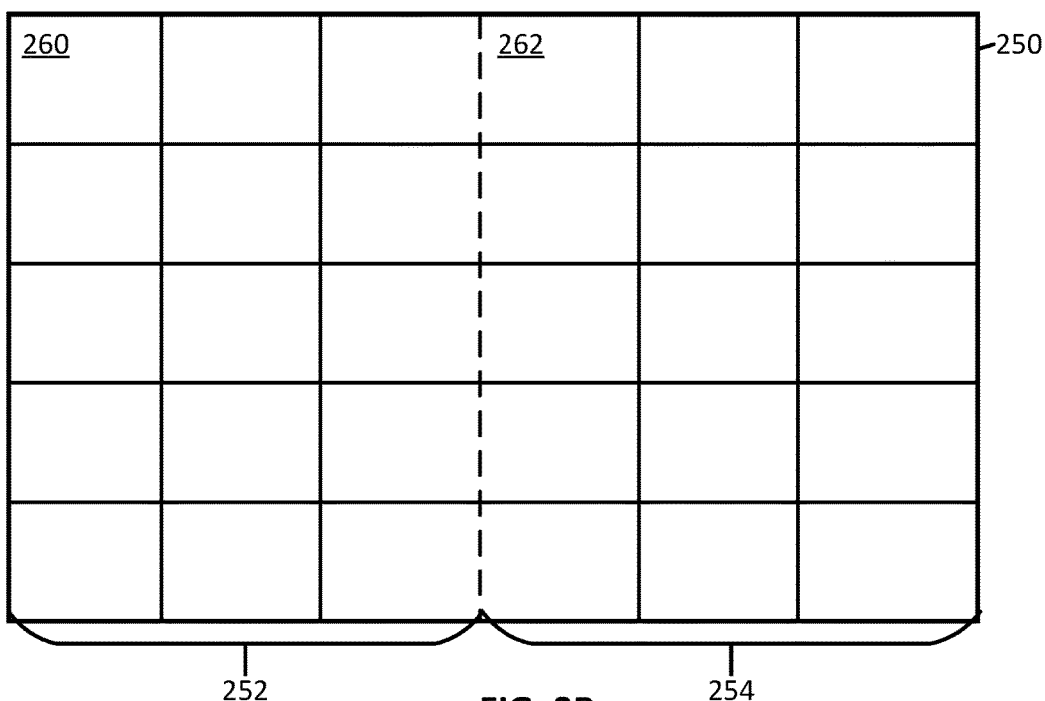

In some embodiments, process 500 can generate one or more fingerprints of a first encoded portion of the selected frame and a second encoded portion of the selected frame at 508. In some embodiments, the first encoded portion of the selected frame can be a first stereoscopic image to be delivered to one eye of a viewer and the second encoded portion of the selected frame can be a second stereoscopic image to be delivered to the other eye of the viewer. In some embodiments, the first encoded portion and the second encoded portion of the selected frame can be encoded in any suitable format. For example, as shown in FIG. 2B, frame 250 can have a left half frame 252, which can correspond to the first encoded portion of frame 250, and a right half frame 254, which can correspond to the second encoded portion of frame 250. Note that, in some embodiments, the first encoded portion of the selected frame and the second encoded portion of the selected frame can be in any suitable arrangement, such as left and right halves (as shown in FIG. 2B), top and bottom halves, interleaved on a pixel-by-pixel basis (e.g., in a checkerboard pattern), interleaved on a frame-by-frame basis, and/or arranged in any other suitable manner. Additionally, note that, in some embodiments, process 500 can generate one or more fingerprints of the first encoded portion of the selected frame and the second encoded portion of the selected frame irrespective of whether or not frame 250 includes stereoscopic content.

It should be noted that process 500 can use any suitable technique or combination of techniques to generate one or more fingerprints of the first encoded portion of the selected frame and the second encoded portion of the selected frame. For example, in some embodiments, process 500 can use the techniques described above in connection with block 506 to generate a first fingerprint that represents the first encoded portion of the selected frame and a second fingerprint that represents the second encoded portion of the selected frame. As discussed above in connection with block 506, in some embodiments, the first fingerprint and the second fingerprint can be based on any suitable information or signatures for each encoded portion of the selected frame, such as histograms of color, saturation, or hue, and/or any other suitable information.

In some embodiments, process 500 can determine whether at least one of the fingerprints generated at blocks 506 and 508 matches a fingerprint of a reference video content item stored in a reference database at 510. Process 500 can determine whether there is a match using any suitable technique or combination of techniques. For example, in some embodiments, process 500 can determine whether a distance (e.g., a Euclidean distance, and/or any other suitable distance metric) between a pattern of any of the generated fingerprints associated with the uploaded video content item and a pattern of fingerprints for a reference video content item is less than a predetermined threshold. As another example, in some embodiments, process 500 can determine whether a correlation between any of the generated fingerprints associated with the uploaded video content item and a fingerprint of a reference video content item exceeds a predetermined threshold. Note that, in some embodiments, process 500 can additionally or alternatively calculate a probability that at least one of the fingerprints generated at blocks 506 and 508 match a fingerprint of a video content item in the reference database. In some such embodiments, process 500 can calculate the probability of a match using any suitable technique or combination of techniques. For example, in some embodiments, process 500 can calculate the probability of a match based on a distance metric between the fingerprints, a correlation between the fingerprints, and/or any other suitable factor or combination of factors (e.g., where the resulting probability score is between 0 and 1).

Note that, in some embodiments, process 500 can determine whether any of the generated fingerprints match a fingerprint of a video content item in the reference database based on fingerprints generated from multiple frames of the uploaded video content item. For example, in some embodiments, process 500 can generate fingerprints for multiple frames of the uploaded video content item and can calculate any suitable metrics (e.g., a distance metric, a correlation metric, and/or any other suitable metric) indicating a closeness of each of the generated fingerprints to fingerprints of a reference video content item. Process 500 can then combine the metrics for each frame to calculate a probability that the uploaded video content item matches the reference video content item. In some embodiments, process 500 can combine fingerprint information across multiple frames of the video content item using whole frames of the video content item (e.g., as generated at block 506), and/or one or both encoded portions of the selected frame (e.g., as generated at block 508).

In some embodiments, process 500 can additionally or alternatively generate one or more audio fingerprints (e.g., at blocks 506 and/or at 508). Process 500 can then determine whether the generated audio fingerprint(s) correspond to a reference audio fingerprint of a reference video in the reference database using any suitable metrics as described above. In some such embodiments, process 500 can determine a probability that the uploaded video content item matches the reference video based on any of the audio fingerprint, the fingerprint(s) corresponding to the entire selected frame of the uploaded video content item, the fingerprint corresponding to the first encoded portion of the uploaded video content item, and/or the fingerprint corresponding to the second encoded portion of the uploaded video content item (e.g., where each of the one or more fingerprints receives a probability score when compared to a reference fingerprint and where a combined probability score can be generated that incorporates each individual probability score).

If, at 510, process 500 determines that one or more of the fingerprints match fingerprints of a reference video content item ("yes" at 510), process 500 can proceed to block 512 and can block storage of the uploaded video content item. In some embodiments, process 500 can cause any suitable message indicating that the uploaded video content item has been blocked from storage to be presented on a user device that transmitted the video content item. For example, in some embodiments, the message can indicate that the uploaded video content item has been blocked because the uploaded video content item has been determined to match a video content item in a reference database (e.g., copyrighted video content, and/or any other suitable video content). In some embodiments, the message can include any other suitable information, such as a name or other identifier of the reference video that matched the uploaded video content item, a name of the creator of the reference video, one or more time points at which the uploaded video content item matched the reference video, and/or any other suitable information. Note that, in some embodiments, process 500 can allow the uploaded video content item to be stored, but can flag the uploaded video content item for further manual review. Alternatively, in some embodiments, process 500 can block storage of the uploaded video content item until further manual review has been completed.

If, at 510, process 500 determines that none of the generated fingerprints match fingerprints of a reference video content item ("no" at 510), process 500 can proceed to block 514 and can allow storage of the uploaded video content item. In some embodiments, the uploaded video content item can then be presented at a later time, for example, on a user device in response to receiving a request for the uploaded video content item. In some embodiments, the uploaded video content item can be stored on server(s) 302. In some embodiments, the uploaded video content item can be stored in connection with any suitable information, such as a name of a creator of the uploaded video content item, a date the video content item was uploaded to server(s) 302, keywords and/or topics associated with the uploaded video content item, and/or any other suitable information. In some embodiments, the stored information can further indicate that the uploaded video content item was not found to match any video content in a reference database and can indicate a time and/or a date on which the uploaded video content item was most recently compared to video content in the reference database.

Note that, in some embodiments, process 500 can repeat blocks 504-510 at any suitable time. For example, in some embodiments, process 500 can repeat blocks 504-510 at a later time (e.g., after the uploaded video content item has been allowed to be stored on server(s) 302) to determine if the uploaded video content item matches video content added to a reference database since the uploaded video content item was approved for storage at block 514. As another example, in some embodiments, process 500 can repeat blocks 504-510 in response to receiving an indication from a user who uploaded the video content item that information about the video content item has changed. As a more particular example, in an instance where the user had previously indicated that the uploaded video content item contains three-dimensional video content that is encoded as stereoscopic video content (e.g., as shown in and described above in connection with FIG. 1A), and subsequently indicates that the uploaded video content is not three-dimensional content, process 500 can repeat blocks 504-510 to determine if one or more fingerprints of whole frames of the video content item match fingerprints of a reference video content item in a reference database.

In some embodiments, at least some of the above described blocks of the process of FIG. 5 can be executed or performed in any order or sequence not limited to the order and sequence shown in and described in connection with the figure. Also, some of the above blocks of FIG. 5 can be executed or performed substantially simultaneously where appropriate or in parallel to reduce latency and processing times. Additionally or alternatively, some of the above described blocks of the process of FIG. 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for identifying content in stereoscopic videos are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for identifying content in stereoscopic videos, the method comprising:
   receiving, from a user device, a video content item for uploading to a content provider;
   selecting a frame from a plurality of frames of the video content item;
   generating a first fingerprint corresponding to the selected frame and a plurality of second fingerprints that each corresponds to an encoded portion of the selected frame;
   determining whether the first fingerprint and the plurality of second fingerprints of the video content item match a reference fingerprint of a plurality of reference fingerprints; and
   in response to determining that at least one of the plurality of second fingerprints matches the reference fingerprint, causing an indication of the match to be presented on the user device.

2. The method of claim 1, further comprising comparing each of the first fingerprint and the plurality of second fingerprints to the plurality of reference fingerprints corresponding to reference video content items.

3. The method of claim 1, further comprising generating one of the plurality of second fingerprints by selecting between a first encoded portion of the selected frame and a second encoded portion of the selected frame.

4. The method of claim 3, wherein the first encoded portion of the selected frame and the second encoded portion of the selected frame correspond to a first image to be presented to a left eye of a viewer and a second image to be presented to a right eye of the viewer when the video content item is presented stereoscopically.

5. The method of claim 3, wherein the first encoded portion of the selected frame is a left half of the selected frame and the second encoded portion of the selected frame is a right half of the selected frame.

6. The method of claim 3, wherein the first encoded portion of the selected frame is a top half of the selected frame and the second encoded portion of the selected frame is a bottom half of the selected frame.

7. The method of claim 1, further comprising receiving, from the user device, an indication that the video content item contains three-dimensional video content, wherein the first fingerprint and the plurality of second fingerprints are generated in response to receiving the indication that the video content item contains three-dimensional video content.

8. A system for identifying content in stereoscopic videos, the system comprising:
   a hardware processor that is configured to:
      receive, from a user device, a video content item for uploading to a content provider;
      select a frame from a plurality of frames of the video content item;
      generate a first fingerprint corresponding to the selected frame and a plurality of second fingerprints that each corresponds to an encoded portion of the selected frame;
      determine whether the first fingerprint and the plurality of second fingerprints of the video content item match a reference fingerprint of a plurality of reference fingerprints; and
      in response to determining that at least one of the plurality of second fingerprints matches the reference fingerprint, causing an indication of the match to be presented on the user device.

9. The system of claim 8, wherein the hardware processor is further configured to compare each of the first fingerprint and the plurality of second fingerprints to the plurality of reference fingerprints corresponding to reference video content items.

10. The system of claim 8, wherein the hardware processor is further configured to generating one of the plurality of second fingerprints by selecting between a first encoded portion of the selected frame and a second encoded portion of the selected frame.

11. The system of claim 10, wherein the first encoded portion of the selected frame and the second encoded portion of the selected frame correspond to a first image to be presented to a left eye of a viewer and a second image to be presented to a right eye of the viewer when the video content item is presented stereoscopically.

12. The system of claim 10, wherein the first encoded portion of the selected frame is a left half of the selected frame and the second encoded portion of the selected frame is a right half of the selected frame.

13. The system of claim 10, wherein the first encoded portion of the selected frame is a top half of the selected frame and the second encoded portion of the selected frame is a bottom half of the selected frame.

14. The system of claim 8, wherein the hardware processor is further configured to receive, from the user device, an indication that the video content item contains three-dimensional video content, wherein the first fingerprint and the plurality of second fingerprints are generated in response to receiving the indication that the video content item contains three-dimensional video content.

15. A non-transitory computer-readable medium containing computer-executable instructions that, when executed by a processor, cause the processor to perform a method for identifying content in stereoscopic videos, the method comprising:

receiving, from a user device, a video content item for uploading to a content provider;

selecting a frame from a plurality of frames of the video content item;

generating a first fingerprint corresponding to the selected frame and a plurality of second fingerprints that each corresponds to an encoded portion of the selected frame;

determining whether the first fingerprint and the plurality of second fingerprints of the video content item match a reference fingerprint of a plurality of reference fingerprints; and in response to determining that at least one of the plurality of second fingerprints matches the reference fingerprint, causing an indication of the match to be presented on the user device.

16. The non-transitory computer-readable medium of claim 15, wherein the method further comprises comparing each of the first fingerprint and the plurality of second fingerprints to the plurality of reference fingerprints corresponding to reference video content items.

17. The non-transitory computer-readable medium of claim 15, wherein the method further comprises generating one of the plurality of second fingerprints by selecting between a first encoded portion of the selected frame and a second encoded portion of the selected frame.

18. The non-transitory computer-readable medium of claim 17, wherein the first encoded portion of the selected frame and the second encoded portion of the selected frame correspond to a first image to be presented to a left eye of a viewer and a second image to be presented to a right eye of the viewer when the video content item is presented stereoscopically.

19. The non-transitory computer-readable medium of claim 17, wherein the first encoded portion of the selected frame is a left half of the selected frame and the second encoded portion of the selected frame is a right half of the selected frame.

20. The non-transitory computer-readable medium of claim 17, wherein the first encoded portion of the selected frame is a top half of the selected frame and the second encoded portion of the selected frame is a bottom half of the selected frame.

21. The non-transitory computer-readable medium of claim 15, wherein the method further comprises receiving, from the user device, an indication that the video content item contains three-dimensional video content, wherein the first fingerprint and the plurality of second fingerprints are generated in response to receiving the indication that the video content item contains three-dimensional video content.

* * * * *